Jan. 1, 1929.	1,697,824
J. W. SCOTT
CLUTCH FOR MATERIAL CARRIERS
Filed Oct. 26, 1926  2 Sheets-Sheet 1
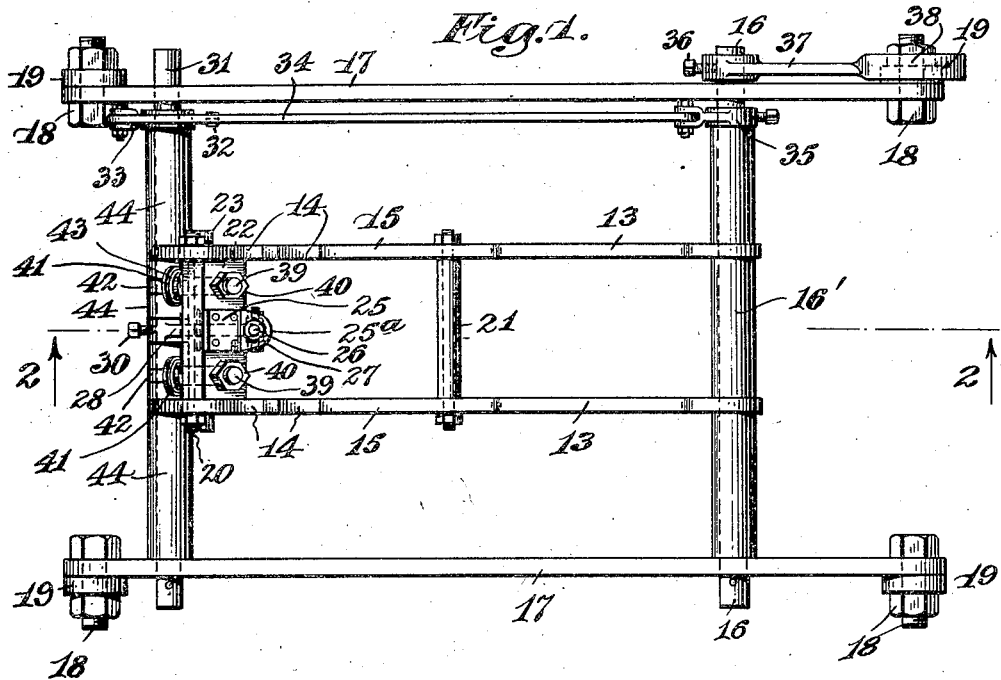
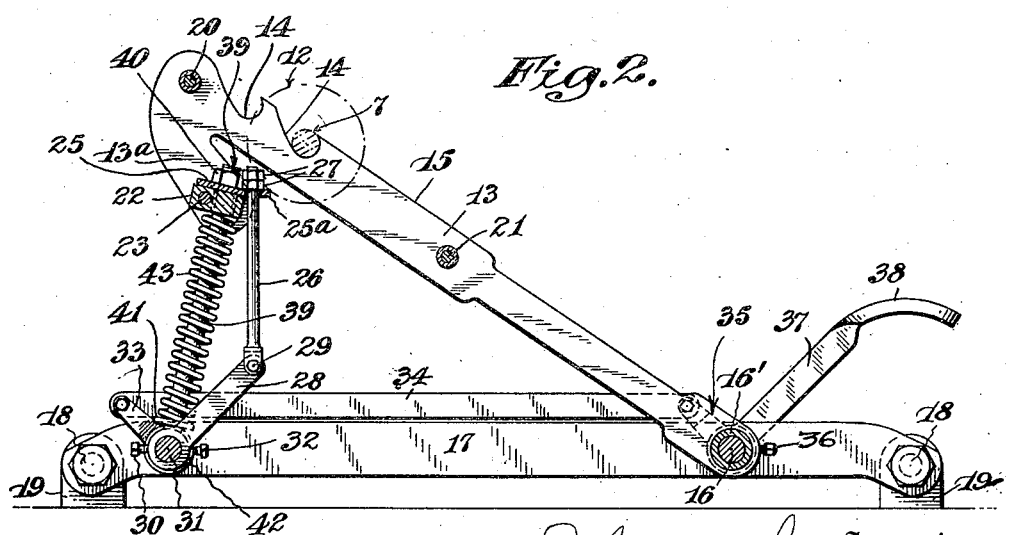
Inventor
John W. Scott
By his Attorney
Frank J. Kent Jan. 1, 1929.  
J. W. SCOTT  
1,697,824  
CLUTCH FOR MATERIAL CARRIERS  
Filed Oct. 26, 1926 2 Sheets-Sheet 2
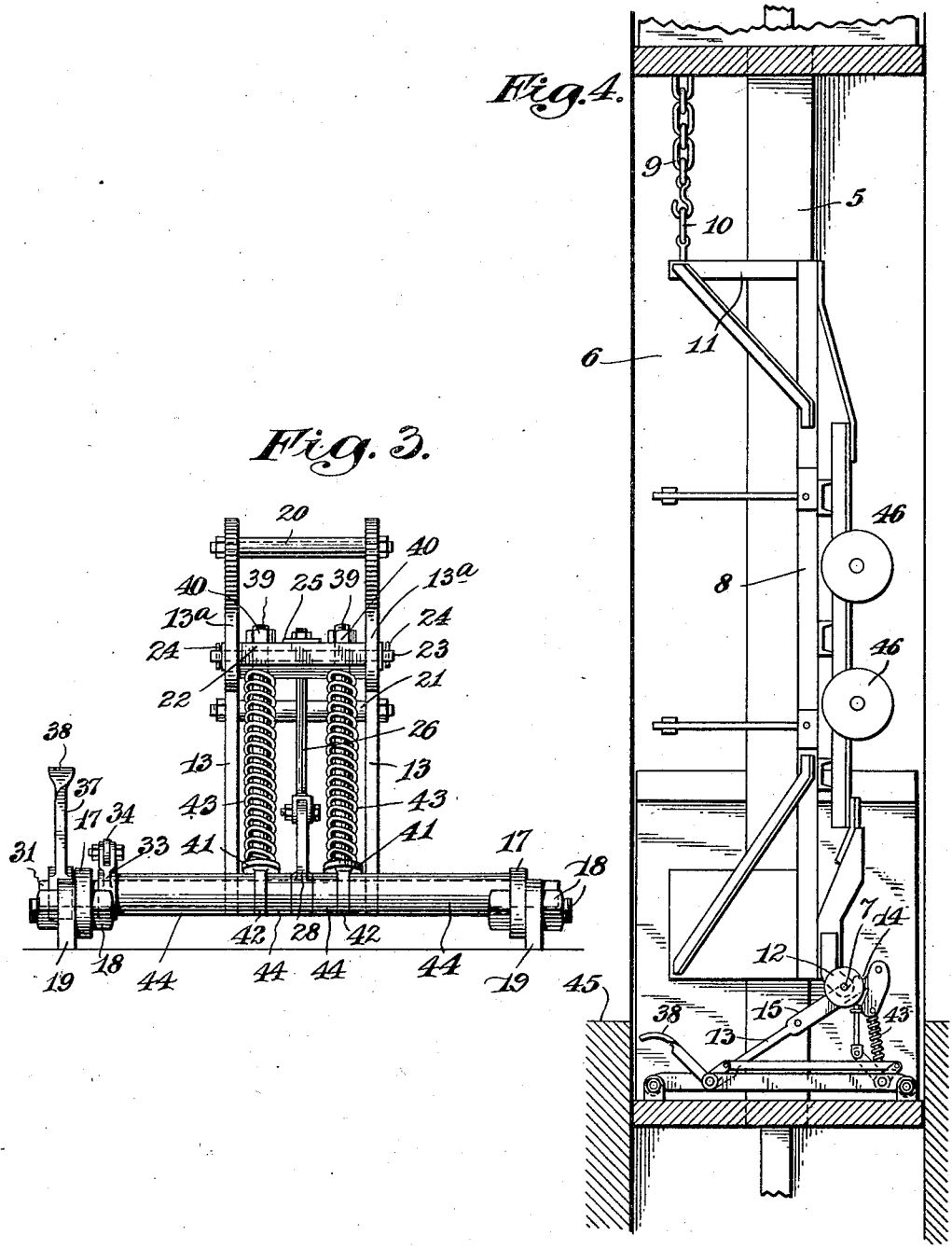

Patented Jan. 1, 1929.

1,697,824

UNITED STATES PATENT OFFICE.

JOHN WILLIAM SCOTT, OF BISBEE, ARIZONA.

CLUTCH FOR MATERIAL CARRIERS.

Application filed October 26, 1926. Serial No. 144,274.

The subject of the present invention is a clutch or retaining means for the lower end of say an up-ended truck or car when the latter has been transferred from a level, say a surface level, to a cage or other elevating means in a hoistway, for transport in said hoistway to another level, say an underground level, where the car and its load are transferred to the latter level for movement of the car and its load over the same to say a material supply point more or less distant from the hoistway.

While the new clutch is of particular value in connection with a hoistway cage where the hoistway is vertical rather than inclined, and also of particular value in connection with a truck or car constructed pursuant to the invention disclosed and claimed in my copending application Serial No. 144,273, filed October 26, 1926, it will of course be understood that the clutch of the present invention is not thus to be limited as to utilization.

An important object of the present invention is to provide a simple, rugged, inexpensive and reliable clutch or retainer for the lower portion of any structure intended to be transported while held in such manner that the structure is supended, or at least held so that its weight is practically completely supported, at a point or points above the clutch or retainer.

A further object is to provide a clutch as just described, wherein simple means are incorporated such that the clutch automatically comes into action, or functions, when the structure to be conveyed in the hoistway is finally moved into place in the cage or the like.

Another object is to provide a simple and reliable clutch for retaining in a cage or the like a structure to be moved to a different level therein, to prevent outswinging of said structure, but a clutch of the latch-lock type, so that a simple and instantaneous deliberate release thereof is possible, as by foot-pressure on a pedal element.

Various other objects and advantages of the invention will be specifically pointed out or apparent hereinafter, in the course of a description of a preferred one of the various possible forms of the invention as shown in the accompanying drawings; it being understood, of course, that such form is merely illustrative of one combination and arrangement of parts calculated to attain the objects of the invention, pursuant to present preference, and hence the detailed description of such form now to be given is not to be taken as at all defining or limiting the invention itself. That is to say, the scope of protection contemplated is to be taken solely from the appended claims, interpreted as broadly as is consistent with the prior art, and with explanatory reference to the specification only where a claim is ambiguous or to be impliedly limited beyond its express terms to avoid such art in order to save the validity of said claims.

In the accompanying drawings:

Fig. 1 is a top plan view of one form of clutch according to the invention.

Fig. 2 is a vertical longitudinal section, taken on line 2—2 of Fig. 1.

Fig. 3 is a front elevation of said clutch, looking toward the right in Fig. 1, but toward the left in Fig. 4; and Fig. 4 is a view illustrating the clutch, shown again in side elevation, in operative condition relative to a rear axle of a wheeled car up-ended and hung vertically in a cage in a vertical hoistway.

As shown in Fig. 4, the new clutch, in the form illustrated, is particularly adapted for use in the bottom of a cage 5, operating in a vertical hoistway, 6, for engaging and securing a rear axle 7 of a material handling car 8, to hold the lower end of the car against outswinging, when the car has been suspended by chains 9 or the like, anchored at their upper ends to the roof of the cage and hooked at their lower ends into swing-rings 10 forming parts of the forward superstructure unit 11 of the car, all as explained in my copending application aforesaid. Also as explained in said application, it is particularly convenient, when the new clutch is used in connection with the invention there disclosed and as there preferably embodied, to have the hook, notch or keeper of the clutch engage the axle 7 of the car.

Such axle, and one of the wheels 12 thereon, are shown in dot and dash lines in Fig. 2.

The form of clutch illustrated includes a pair of spaced and inclined bars 13 carrying as axle-keepers a series of hook-depressions or upwardly sharply breasted notches 14 for engaging the axle 7 as shown. Each of these bars, below said notches, has a ramp-edge 15, constituting such ramp in the present case as the result of the inclination of the bar 13 rather than as the result of a particular shaping of said edge. These bars are pivotally mounted at their lower ends by being fixedly connected to sleeve 16' loose on a shaft 16 journalled at opposite ends in a pair of horizontal side-frame members 17 forming parts of the bed-structure of the clutch by being bolted at 18 to short standards 19 suitably secured to the floor of the cage.

The bars 13, spaned by spacing and tie bars 20 and 21 above and below the series of notches 14, are also provided with downwardly extended goose-neck portions 13ᵃ. Between these portions 13ᵃ is pivotally hung a cross-block 22 on a rod 23 pinned at both ends as indicated in Fig. 3. A small plate 25 carrying a protruding terminal lip 25ᵃ is riveted transverse to and at the middle of the cross-block; said lip having a through aperture slightly loosely taking the upper end-portion of a pull-rod or link 26 the upper end of which is threaded for nuts 27 and the lower end of which is bifurcated for embracing the upper end of an arm 28 to which such bifurcation is pivoted as indicated at 29. The lower end of this arm is fast, by means of a set-screw 30, on a shaft 31 journalled in the side-frame members 17, at the back of the clutch. Also fast on said shaft 31, by a set-screw 32, is another arm 33 connected at its upper end by a link 34 to the upper end of a similar arm 35 similarly fixed to the shaft 16 at the front end of the clutch, between one end of the sleeve 16' and the adjacent side frame member 17. Beyond said frame member 17, said shaft 16 has fixed thereto by a set-screw 36, an arm 37 forwardly and upwardly inclined and shaped at its free end to constitute a depressible pedal 38.

Cross-block 22, at opposite sides of plate 25, has a pair of through apertures surrounding the upper end-portions of two spring-rods 39, the upper ends of said rods being threaded for the application of nuts 40 and the lower ends of said rods having coil spring supporting collars 41, expansive coil springs 43 being mounted on the rods as shown. Each rod and collar form parts of a single rigid structure, a complementary part of which is a larger and heavier collar 42 in a vertical plane loose on shaft 31. Spacing sleeves 44, of various lengths, are on said shaft 31 as clearly indicated in Fig. 2.

*Operation.*

Assume that an up-ended object, suspended as to its entire weight from an upper portion thereof, as the car 8 when suspended from the chains 9, is swung into the cage 5 to take up its natural position of suspension therein. Then the car would have an inclination such that the axle 12 lies directly under the swing-rings 10 of the car. This position would, in the case illustrated, represent the final step in transferring the car from the level 45 completely past and out of contact with said level, following the steps of rolling the car on its wheels 46 to bring its lead-end 11 up close to the hoistway, bringing the cage to a position where the hooks on the lower ends of the chains 9 could be secured to the swing-rings 10, and raising the cage first to tauten said chains, then to pull them upward to up-end the lead-end of the car and rock the trail-end of the car downwardly about the rear pair of the wheels 46 onto the trailer wheels 12, and then to pull said chains further upward to roll the car on said trailer wheels and toward the hoistway and into the same to suspend the car entirely free from any support at level 45.

All an attendant has to do now, then, is to exert a moderate pushing pressure on the slightly outswung trail-end of the car, in the direction of the spring-carrying end of the clutch. Axle 7 thereupon engages the ramp-edges 15 of the inclined bars 13; these bars are depressed against the compression of springs 43, and the axle is seized securely by a pair of notches 14.

When the cage has arrived at the destination level, all the attendant has to do, to permit swinging out of the trail-end of the car, to permit the trailer wheels to come to rest on said level when the cage is thereafter slightly lowered, is to apply his foot to pedal 38 and depress the same.

As already emphasized, the new clutch or retainer is capable of various other uses than as an element of a system of inter-level transportation for wheeled trucks or cars and their loads; although the particular embodiment of the invention illustrated has been particularly designed, as to structure, and particularly described, as to operation, with the present thought in mind that an especially useful employment of the new clutch is in connection with an inter-level transportation system of the kind mentioned.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. An elevating means for an up-ended wheeled car, comprising a structure including, in combination with an upper support having means for engaging the car near its lead-end, a lower support, and a retaining device on the lower support for engaging the car near its trail-end when the car is swung relative to the upper support to a position substantially parallel to the line of travel of said elevating means.

2. An elevating means for a wheeled car, comprising, the combination with a hoistway and a hoisting means therein, of a conveyor on said hoisting means comprising the combination of a suspension device attachable to the car to up-end the same during upward movement of said conveyor, and a hook means for engaging the car near its trail-end on further upward movement of said conveyor.

3. An elevating means for a wheeled car, comprising, the combination with a hoistway and a hoisting means therein, of a conveyor on said hoisting means comprising the combination of a suspension device attachable to the car to up-end the same during upward movement of said conveyor, and a latch device for engaging the car near its trail-end on further upward movement of said conveyor.

4. An elevating means for a wheeled car, comprising, the combination with a hoistway and a hoisting means therein, of a conveyor on said hoisting means comprising a means for connection to the lead-end of the car to rock the same about the axis of one of its wheels during upward movement of said conveyor, and a lower support having automatically operating means for releasably locking the car against outward movement in the conveyor when the conveyor is elevated sufficiently to cause free suspension of the car therein.

5. In a material transportation system the combination with a wheeled carrier and an elevating carrier for transferring the wheeled carrier to another level, of a device for securing the lower end of the wheeled carrier when up-ended and disposed on the elevating carrier, said device including a movable member carrying a gripper portion for a part of the wheeled carrier when disposed as aforesaid, and a movable member for moving the first movable member to release said gripper portion from said part of the wheeled carrier.

6. In a material transportation system, the combination with a wheeled carrier and an elevating carrier for transferring the wheeled carrier to another level, of a device for securing the lower end of the wheeled carrier when up-ended and disposed on the elevating carrier, said device including a detent element for engaging a predetermined part of said wheeled carrier and an element engaged by the wheeled carrier while moving toward the field of operation of said detent adapted as the result of said engagement to cause said detent to engage said wheeled carrier when said predetermined part arrives at said field of operation.

7. In a material transportation system, the combination with a wheeled carrier and an elevating carrier for transferring the wheeled carrier to another level, of a device for securing the lower end of the wheeled carrier when up-ended and disposed in the elevating carrier, said device including a movably mounted member carrying a means for engaging a predetermined part of the wheeled carrier when said means and said part are in predetermined positions, means for holding said movably mounted member normally to maintain said engaging means in its said predetermined position, and means operable at will for moving said engaging means away from its said predetermined position to release the wheeled carrier.

8. In a material transportation system, the combination with a wheeled carrier and an elevating carrier for transferring the wheeled carrier to another level, of a device for securing the lower end of the wheeled carrier when up-ended and disposed in the elevating carrier, said device including a movably mounted member carrying a means for engaging a predetermined part of the wheeled carrier when said means and said part are in predetermined positions, means for holding said movably mounted member normally to maintain said engaging means in its said predetermined position, and means operable at will for causing relative movement between said engaging means and said part to release the wheeled carrier.

9. In a material transportation system, the combination with a wheeled carrier and an elevating carrier for transferring the wheeled carrier to another level, of a device for securing the lower end of the wheeled carrier when up-ended and disposed in the elevating carrier, said device including a movably mounted member carrying a means for engaging a predetermined part of the wheeled carrier when said means and said part are in predetermined positions, said movably mounted member also having means associated therewith for automatically moving said engaging means away from its said predetermined position and out of the path of movement of said part of the wheeled carrier as the latter moves toward its said predetermined position and for thereupon automatically returning said engaging means to its said predetermined position when said part arrives at its said predetermined position.

10. An elevating means for a wheeled car, comprising an upper support, means for detachably suspending one end of the wheeled car from the upper support, a lower support, and a retaining device for holding the lower end of the car in alinement with the elevator.

11. An elevating means for a car having wheels for normally supporting it with its longest axis horizontal, comprising a cage adapted to receive the car in a position with its longest axis vertical, the cage having an upper support, means for detachably suspending the car in vertical position from the upper support, and a retaining device for holding the lower end of the car within the boundaries of the cage.

12. A clutch comprising side frame members, a shaft extending between the side frame members, a bar pivoted to the shaft and carrying a notch near the end remote from the shaft, a second shaft extending between the side frame members, toggle levers mounted on the second shaft and connected to the notched end of the bar for depressing the bar, a spring device normally biasing the bar upward, and a foot pedal connected to the toggle levers.

In testimony whereof I affix my signature.

JOHN WILLIAM SCOTT.